US012228260B2

(12) United States Patent
Liu et al.

(10) Patent No.: US 12,228,260 B2
(45) Date of Patent: Feb. 18, 2025

(54) VEHICLE HIGH-BEAM ILLUMINATION UNIT WITH LIGHT GUIDE OPTICAL ELEMENT

(71) Applicant: HASCO VISION TECHNOLOGY CO., LTD., Shanghai (CN)

(72) Inventors: Fang Liu, Shanghai (CN); Zhiping Qiu, Shanghai (CN); Dapan Zhang, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/253,141

(22) PCT Filed: Mar. 12, 2021

(86) PCT No.: PCT/CN2021/080516
§ 371 (c)(1),
(2) Date: May 16, 2023

(87) PCT Pub. No.: WO2022/110570
PCT Pub. Date: Jun. 2, 2022

(65) Prior Publication Data
US 2023/0417385 A1 Dec. 28, 2023

(30) Foreign Application Priority Data
Nov. 27, 2020 (CN) .......................... 202022812461.2

(51) Int. Cl.
*F21S 41/32* (2018.01)
*F21S 41/27* (2018.01)

(52) U.S. Cl.
CPC ............... *F21S 41/27* (2018.01); *F21S 41/32* (2018.01)

(58) Field of Classification Search
CPC .......... F21S 41/322; F21S 4/24; F21S 41/285; F21S 41/141; F21S 41/30; F21S 41/32; F21S 41/143; B60Q 1/04
See application file for complete search history.

(56) References Cited

U.S. PATENT DOCUMENTS 1,888,995 A * 11/1932 Matter .................... F21S 41/28 362/305
7,611,272 B2 * 11/2009 Specht .................... F21S 41/43 362/555

(Continued)

FOREIGN PATENT DOCUMENTS

CN 101457892 A 6/2009
CN 108119866 A 6/2018

(Continued)

OTHER PUBLICATIONS

GB 4599-2007, Shanghai Institute of Automotive Lighting, "Motor vehicle headlamps equipped with filament lamps" (2007) National Standard. English translation of the relevant portion thereof.

*Primary Examiner* — Ismael Negron
(74) *Attorney, Agent, or Firm* — Volpe Koenig

(57) ABSTRACT

A high-beam optical element includes a light incident part, a light guide part and a light emitting part sequentially arranged from back to front. The light incident part includes a high-beam incident part and an auxiliary lighting structure. The auxiliary lighting structure is configured to receive auxiliary lighting and transmit it to the light guide part after at least one reflection and then project it from the light emitting part as a low-beam III. The high-beam optical element is part of a high-beam illumination unit in a vehicle.

11 Claims, 9 Drawing Sheets

E-E

(56) References Cited

U.S. PATENT DOCUMENTS

| | | | | | |
|---|---|---|---|---|---|
| 9,664,352 | B2 * | 5/2017 | Scheibner | F21S 41/147 |
| 9,719,645 | B2 * | 8/2017 | Wintzer | F21S 41/147 |
| 10,151,437 | B2 * | 12/2018 | Gromfeld | F21S 41/265 |
| 10,168,014 | B2 * | 1/2019 | Lee | F21S 41/143 |
| 10,174,896 | B2 * | 1/2019 | Owada | G02B 19/0047 |
| 10,337,684 | B2 * | 7/2019 | Joerg | F21S 41/27 |
| 10,451,237 | B1 * | 10/2019 | Zorn | F21S 41/43 |
| 10,605,428 | B2 * | 3/2020 | Ecker-Endl | F21S 41/663 |
| 11,781,733 | B2 * | 10/2023 | Qiu | F21S 41/143<br>362/235 |
| 2020/0080699 | A1 * | 3/2020 | Renaud | F21S 41/47 |
| 2023/0040779 | A1 * | 2/2023 | Zhu | F21S 41/151 |

FOREIGN PATENT DOCUMENTS

| | | | |
|---|---|---|---|
| CN | 109563974 | A | 4/2019 |
| CN | 210462847 | U | 5/2020 |
| CN | 111503591 | A | 8/2020 |
| CN | 211399634 | U | 9/2020 |
| CN | 211551479 | U | 9/2020 |
| CN | 214038235 | U | 8/2021 |
| EP | 3572719 | A1 | 11/2019 |
| JP | 2018142457 | A | 9/2018 |
| WO | 2013073419 | A1 | 5/2013 |
| WO | 2013080158 | A1 | 6/2013 |

* cited by examiner

VEHICLE HIGH-BEAM ILLUMINATION UNIT WITH LIGHT GUIDE OPTICAL ELEMENT

CROSS REFERENCE TO RELATED APPLICATIONS

This application is a 35 U.S.C. § 371 national stage of International Application No. PCT/CN2021/080516, which was filed Mar. 12, 2021 and claims the benefit of Chinese Patent Application No. 202022812461.2, filed on Nov. 27, 2020, both of which are incorporated herein by reference as if fully set forth.

FIELD OF THE INVENTION

The present disclosure relates to vehicle lamps, in particular to a high-beam optical element. Furthermore, the present disclosure also relates to a high-beam illumination unit including the high-beam optical element, and a vehicle.

BACKGROUND OF THE INVENTION

With the development of vehicle technology, more and more vehicle headlamps form low-beam illumination and high-beam illumination by providing a plurality of illumination units and meanwhile achieve diversification of the styles of the vehicle lamps. The plurality of illumination units may be composed of one or more low-beam illumination units and one or more high-beam and low-beam integrated illumination units, may also be composed of a plurality of high-beam and low-beam integrated illumination units, or be composed of one or more low-beam illumination units and one or more high-beam illumination units, or be composed of one or more high-beam and low-beam integrated illumination units and one or more high-beam illumination units. The above low-beam illumination unit refers to an illumination unit that projects all or part of light shape of low beam. The above high-beam illumination unit refers to an illumination unit that projects all or part of light shape of high beam. The above high-beam and low-beam integrated illumination unit refers to an illumination unit that not only projects all or part of light shape of low beam, and also projects all or part of light shape of high beam. The above part of the light shape refers to that the light shape of low beam or high beam is formed by splicing or superimposing the light shapes projected by a plurality of illumination units, wherein each illumination unit projects only part of the light shape of low beam or high beam.

When the plurality of illumination units are composed of one or more low-beam illumination units and one or more high-beam and low-beam integrated illumination units, or are composed of a plurality of high-beam and low-beam integrated illumination units, all the illumination units emit light in a low-beam illumination mode. However, when the plurality of illumination units are composed of one or more low-beam illumination units and one or more high-beam illumination units, or are composed of one or more high-beam and low-beam illumination units and one or more high-beam illumination units, the high-beam illumination units are not lighted in the low-beam illumination mode, and at this time, not all of the illumination units are lighted, which does not give rise to the styling advantages of the plurality of illumination units. Therefore, in the prior that, the illumination units that is incapable of projecting the light shape of low beam or part of light shape of low beam cannot achieve the function of emitting light in the low-beam illumination mode.

Based on people's demands on aesthetics of the styles of the vehicle lamps, there is a need to design a new vehicle lamp optical element to address the drawback that the high-beam illumination unit cannot be lighted in the low-beam illumination mode.

SUMMARY OF THE INVENTION

In a first aspect, the problem to be solved by the present disclosure is to provide a high-beam optical element which is capable of achieving a lighting effect in a low-beam illumination mode and has a simple structure.

Moreover, in a second aspect, the problem to be solved by the present disclosure is to provide a high-beam illumination unit which is capable of achieving a lighting effect in a low-beam illumination mode and has a simple structure.

Further, in a third aspect, the problem to be solved by the present disclosure is to provide a vehicle, an illumination of the vehicle capable of achieving a lighting effect of a high-beam illumination unit in a low-beam illumination mode.

In order to solve the above technical problems, in a first aspect, the present disclosure provides a high-beam optical element, including a light incident part, a light guide part and a light emitting part which are sequentially arranged from back to front. The light incident part includes a high-beam incident part and an auxiliary lighting structure. Light incident to the auxiliary lighting structure can be transmitted to the light guide part by the auxiliary lighting structure after at least one reflection, then is transmitted to the light emitting part by the light guide part, and is projected into a low-beam III region by a light emitting surface of the light emitting part.

As a preferred mode, the auxiliary lighting structure includes an auxiliary lighting incident surface, a first reflecting surface and a second reflecting surface. A rear end surface of the auxiliary lighting structure is formed as the auxiliary lighting incident surface. The first reflecting surface can reflect light received by the auxiliary lighting incident surface to the second reflecting surface, and the second reflecting surface can reflect light reflected to the second reflecting surface by the first reflecting surface to the light guide part.

Preferably, the auxiliary lighting structure is located below the high-beam incident part, and the first reflecting surface is located below the second reflecting surface.

More preferably, the auxiliary lighting incident surface includes a vertical light incident surface and an oblique light incident surface, wherein the oblique light incident surface is arranged to extend obliquely forward and downward from a bottom end of the vertical light incident surface.

Specifically, a longitudinal section line of the first reflecting surface is provided as a forward convex curve, and a transverse section line of the first reflecting surface is provided as a backward concave curve. A longitudinal section line and a transverse section line of the second reflecting surface are respectively provided as backward convex curves.

Typically, a light diffusion structure is arranged on the second reflecting surface.

As another preferred mode, a light-tight housing is arranged or integrally formed on an outer side surface of the light guide part.

Preferably, the high-beam incident part includes at least one light incident structure. A rear end surface of each of the light incident structures is provided as a backward convex curved surface or conical surface, and the light incident structures are arranged in a matrix mode. A light emitting surface of the light emitting part is provided as a forward convex surface formed by splicing a plurality of planar surfaces or curved surfaces in a grid-like distribution.

In a second aspect, the present disclosure provides a high-beam illumination unit, including the above any high-beam optical element, a circuit board, a high-beam source arranged in correspondence with the high-beam incident part, and an auxiliary lighting source arranged in correspondence with the auxiliary lighting structure, wherein the high-beam source and the auxiliary lighting source are arranged on the circuit board.

In a third aspect, the present disclosure provides a vehicle including the above high-beam illumination unit.

With the above technical solution, the high-beam optical element of the present disclosure is provided with an auxiliary lighting structure on one side of the high-beam incident part. Light incident to the auxiliary lighting structure is transmitted to the light guide part after at least one reflection, then is transmitted to the light emitting part by the light guide part, and subsequently is projected into the low-beam III region by the light emitting surface of the light emitting part. When a person stands in front of a vehicle lamp, this part of light is directed directly to the human eyes obliquely upward, making this person see that the high-beam illumination unit also emits light, and achieving a visual effect of lighting of the light emitting surface in the low-beam illumination mode. The light incident to the auxiliary lighting structure is directly transmitted and projected by the light guide part and the light emitting part, and compared with the solution that light is subjected to total reflection in the light emitting part, and is utilized to form light subjected to diffuse reflection via impurities in the light emitting part, and the light subjected to diffuse reflection is directed to the human eyes to achieve the light emitting effect of the high-beam illumination unit, the high-beam optical element in the present disclosure is employed to make the high-beam illumination unit seen brighter, such that the lighting brightness of the high-beam illumination unit is more easily consistent with the brightness of the low-beam illumination unit in the statutory scope of illuminance of the light shape in the low-beam III region, thereby achieving a better lighting effect of the appearance style of the vehicle lamp.

Other advantages of the present disclosure and the technical effects of the preferred embodiments are further described in the following specific implementation modes.

DESCRIPTION OF REFERENCE SIGNS

Figure 1:
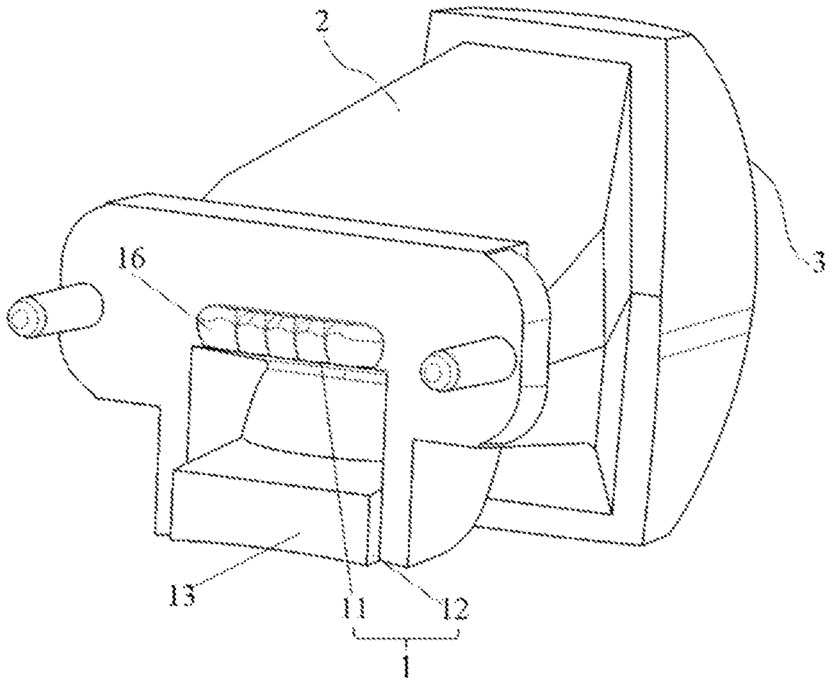
FIG. 1 is a schematic structural diagram I of a high-beam optical element in a specific embodiment of the present disclosure.
Figure 2:
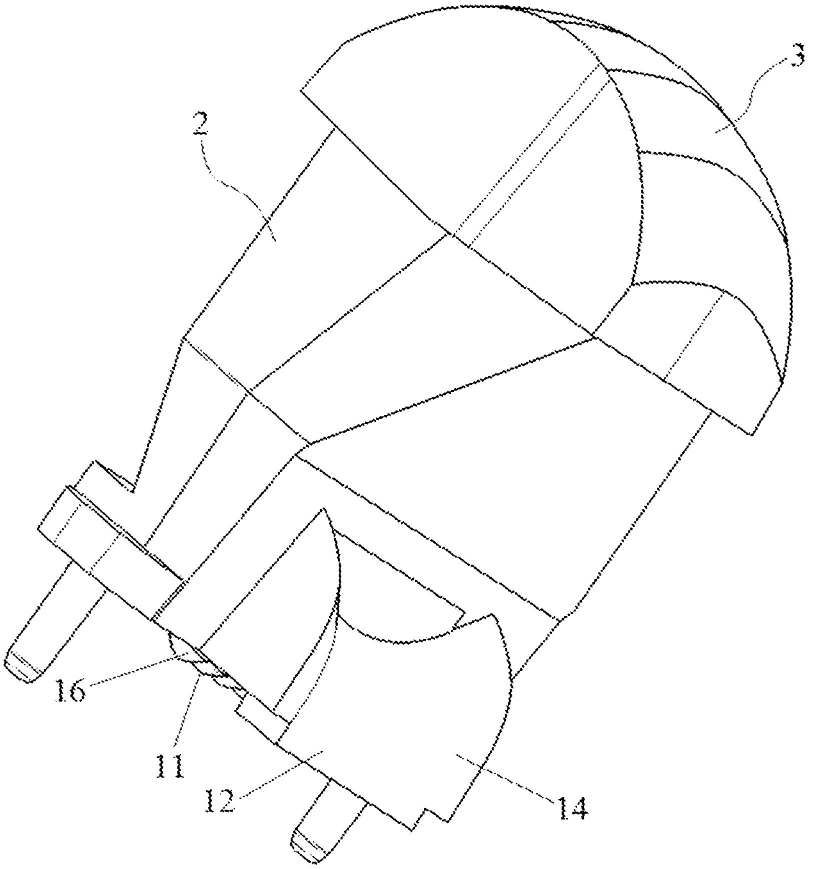
FIG. 2 is a schematic structural diagram II of the high-beam optical element shown in FIG. 1.
Figure 3:
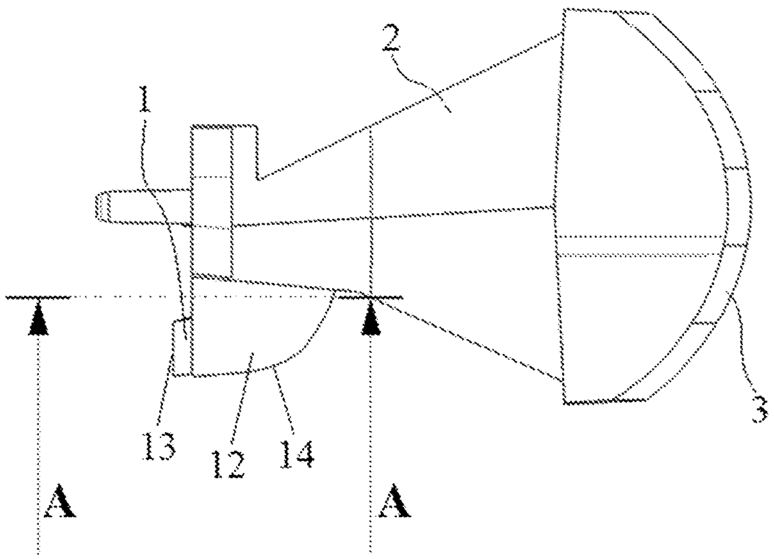
FIG. 3 is a side view of the high-beam optical element shown in FIG. 1.

| | |
|---|---|
| 1 light incident part | 11 high-beam incident part |
| 12 auxiliary lighting structure | 13 auxiliary lighting incident surface |
| 131 vertical light incident surface | 132 oblique light incident surface |
| 14 first reflecting surface | 15 second reflecting surface |
| 16 light incident structure | 2 light guide part |
| 3 light emitting part | 4 light-tight housing |
| 5 circuit board | 6 high-beam source |
| 7 auxiliary lighting source | 8 heat radiator |

Detailed Description of the Embodiments

The specific embodiments of the present disclosure are described in detail in combination with the following drawings, and it should be understood that the specific embodiments described here are only used for describing and explaining the present disclosure, and the protection scope of the present disclosure is not limited to the following specific embodiments.

In the description of the present disclosure, it needs to be explained that, some of orientation words involved in the following description to clearly illustrate the technical solutions of the present disclosure, for example, “front”, “rear”, “left”, “right”, “up”, “down”, or the like, have meanings provided by analogy according to the orientation indicated by the light transmission direction. For example, taking a high-beam optical element as an example, an end of the high-beam optical element close to a high-beam source 6 refers to rear, and an end of the high-beam optical element away from the high-beam source 6 refers to front. It also should be understood that an end at which a light incident part 1 of the high-beam optical beam is positioned refers to rear, and an end at which a light emitting part 3 is positioned refers to front. Relative to front and rear directions of the high-beam optical element, directions represented by left and right sides of the high-beam optical element are left and right directions, and directions represented by upper and lower sides of the high-beam optical element are up and down directions.

In the description of the present disclosure, it should be noted that, unless otherwise expressly specified and defined, the terms "mount" and "connection" should be understood in a broad sense, for example, it may be fixed connection, detachable connection, or integrated connection; it may be direct connection or indirect connection through an intermediate medium, and it may be internal communication of two elements or refers to an interaction relationship between the two elements. Those skilled in the art may understand the specific meanings of the above terms in the present disclosure according to specific conditions. In the present disclosure, a transverse section line refers to a section line obtained by sectioning a certain plane through a cross section in a horizontal direction, and a longitudinal section line refers to a section line obtained by sectioning a certain plane through a cross section extending in a front-rear direction.

The present disclosure provides a high-beam optical element. Referring to FIGS. 1 to 11, the high-beam optical element includes a light incident part 1, a light guide part 2 and a light emitting part 3 which are sequentially arranged from back to front. The light incident part 1 includes a high-beam incident part 11 and an auxiliary lighting structure 12. Light incident to the auxiliary lighting structure 12 is transmitted to the light guide part 2 by the auxiliary lighting structure 12 after at least one reflection, then is transmitted to the light emitting part 3 by the light guide part 2, and is projected into a low-beam III region by a light emitting surface of the light emitting part 3.

In the present disclosure, the light incident part 1, the light guide part 2, and the light emitting part 3 can be independently arranged or integrally formed to ensure the accuracy of relative positions therebetween, and may employ materials such as transparent plastic, silicone and glass, wherein the plastic may employ PMMA or PC.

In order to better illustrate the working process of the high-beam optical element provided by the present disclosure, detailed descriptions and explanations are provided below in combination with the high-beam optical element applied to a high-beam illumination unit. A high-beam source 6 corresponding to the high-beam incident part 11, and an auxiliary lighting source 7 corresponding to the auxiliary lighting structure 12 are arranged in the high-beam illumination unit. The working process of the high-beam illumination unit is as follows: In a low-beam illumination mode, the auxiliary lighting source 7 is turned on, and light emitted by the auxiliary lighting source 7 is incident to the auxiliary lighting structure 12, is reflected by the auxiliary lighting structure 12 for at least one time, then is transmitted to the light guide part 2, is subsequently transmitted to the light emitting part 3 directly by the light guide part 2, and is projected into the low-beam III region by the light emitting surface of the light emitting part 3. The light in the III region may be emitted obliquely upward from the inside of a vehicle lamp to illuminate a sign board or the like on the road. Therefore, when a person stands in front of the vehicle lamp, this part of light is directed directly to the human eyes obliquely upward, making this person see that the high-beam illumination unit also emits light, and achieving a visual effect of lighting of the high-beam illumination unit in the low-beam illumination mode. At this time, the light incident to the auxiliary lighting structure 12 is reflected and then is directly transmitted and projected by the light guide part 2 and the light emitting part 3 into the low-beam III region, which not only creates a visual effect of the upper beam lighting unit's light output surface being illuminated. but also compared with a solution that light is subjected to total reflection in the light emitting part 3, and is utilized to form light subjected to diffuse reflection via impurities in the light emitting part 3, and the light subjected to diffuse reflection is incident to the human eyes to achieve the light emitting effect of the high-beam illumination unit, the high-beam optical element in the present disclosure is employed to make the high-beam illumination unit seen brighter, such that the lighting brightness of the high-beam illumination unit is more easily consistent with the brightness of a low-beam illumination unit, thereby achieving a better lighting effect of the appearance style of the vehicle lamp, and improving the aesthetics of the appearance style of the vehicle lamp. In a high-beam mode, the high-beam source 6 is turned on, and light emitted from the high-beam source 6 enters from a light incident surface of the high-beam incident part 11, is transmitted to the light guide part 2 by the high-beam incident part 11, is transmitted to the light emitting part 3 by the light guide part 2, and finally is emitted by the light emitting surface of the light emitting part 3 to form high-beam illumination light.

Figure 17:
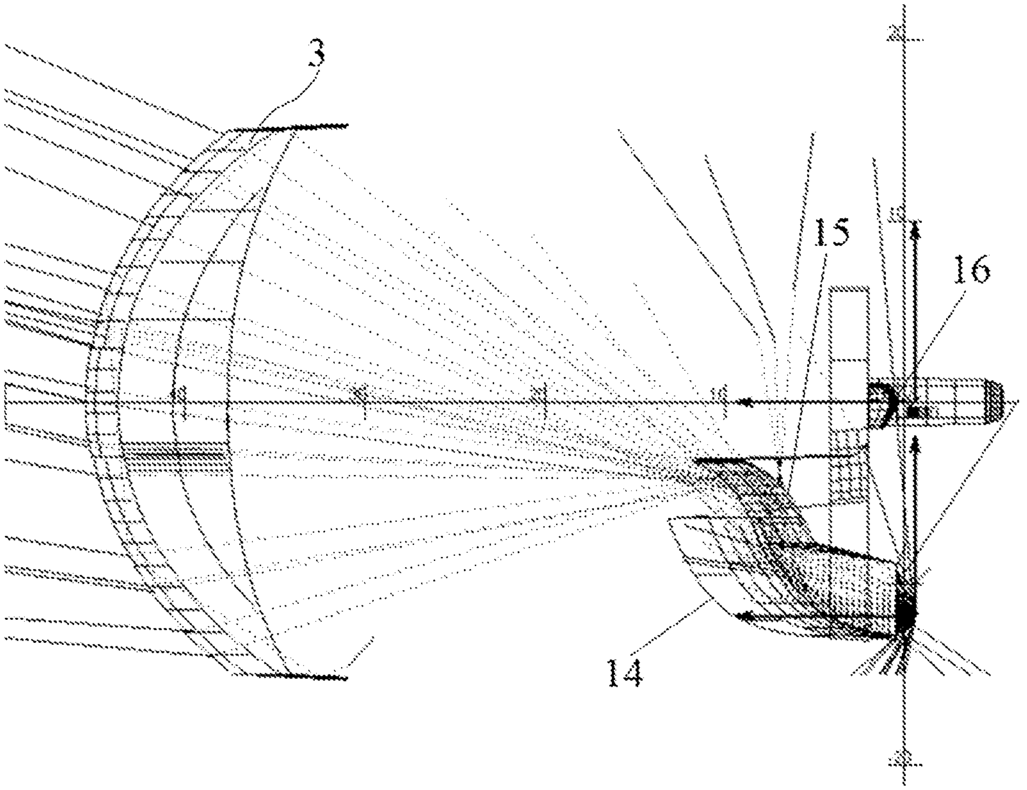
FIG. 17 is an optical path diagram of light incident to an auxiliary lighting structure of the present disclosure.
Figure 18:
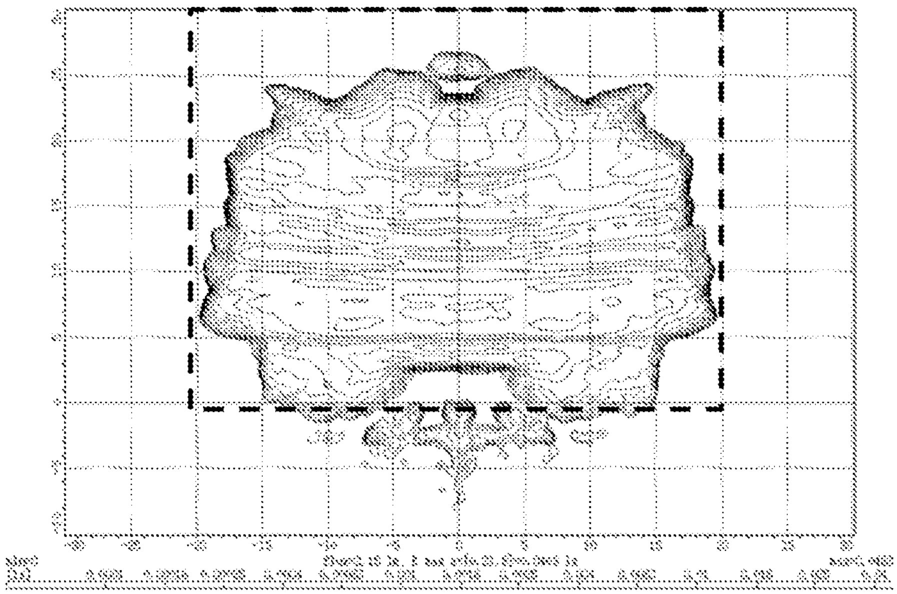
FIG. 18 is a diagram of a light shape (shown in dotted line box) formed by light incident to an auxiliary lighting structure in the high-beam optical element shown in FIG. 1.

As a preferred embodiment of the present disclosure, the auxiliary lighting structure 12 includes an auxiliary lighting incident surface 13, a first reflecting surface 14 and a second reflecting surface 15. A rear end surface of the auxiliary lighting structure 12 is formed as the auxiliary lighting incident surface 13. The first reflecting surface 14 can reflect light received by the auxiliary lighting incident surface 13 to the second reflecting surface 15, and the second reflecting surface 15 can reflect light reflected to the second reflecting surface 15 by the first reflecting surface 14 to the light guide part 2. The arrangement of the first reflecting surface 14 and the second reflecting surface 15 not only enable the light received by the auxiliary light incident surface 13 to be efficiently transmitted to the light guide part 2, but also enable the light to form a certain degree of diffusion separately through the reflection of the first reflection surface 14 and the reflection of the second reflection surface 15, thereby achieving a more uniform light shape projected by the light emitting surface of the light emitting part 3 and lowering the illuminance of the light shape. At this time, an optical path diagram after lighting of the auxiliary lighting source 7 is as shown in FIG. 17, and light projected by the light emitting surface of the light emitting part 3 is projected onto a light distribution screen to form an auxiliary lighting shape as shown in FIG. 18.

In the present disclosure, the auxiliary lighting structure 12 may be located at any one of positions above, below, on the left or right of the high-beam incident part 11. Specifically, the structural form of the auxiliary lighting structure 12 and the high-beam incident part 11 may be determined according to actual production and use demands. Preferably, the auxiliary lighting structure 12 is located below the high-beam incident part 11, and the first reflecting surface 14 is located below the second reflecting surface 15, which facilitates the structural design of the high-beam optical element to reduce or avoid the influence on low-beam illumination when applied to the vehicle lamp.

Figure 19:
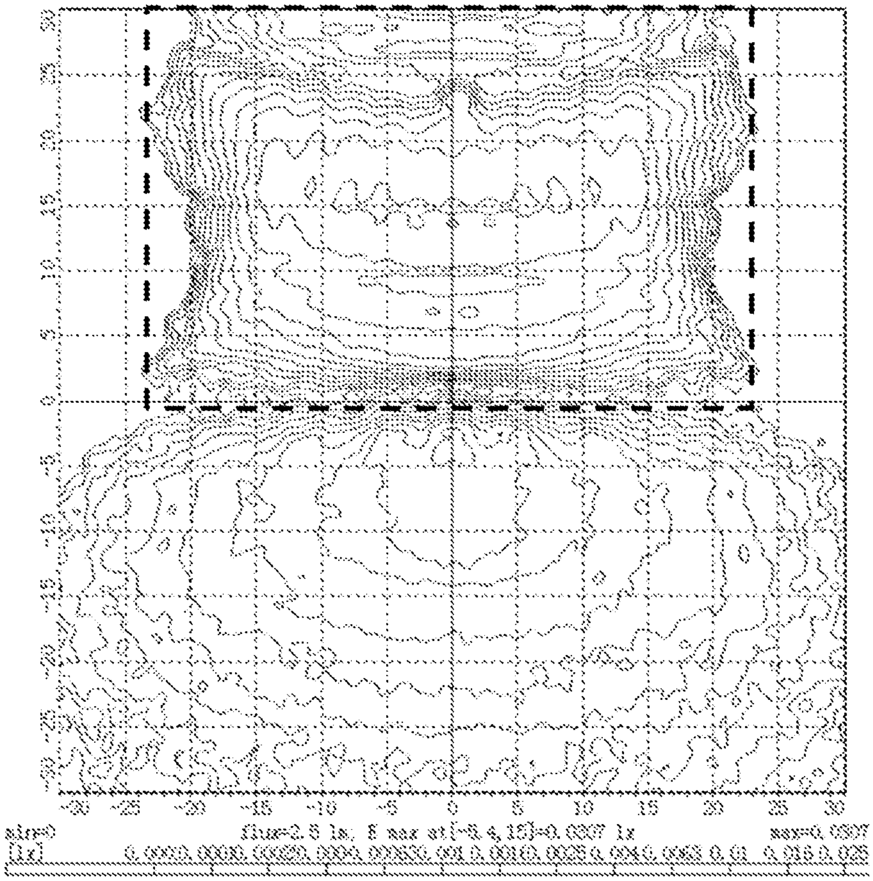
FIG. 19 is a diagram of a light shape (shown in dotted line box) formed by light incident to an auxiliary lighting structure in the high-beam optical element shown in FIG. 7.

In the present disclosure, the auxiliary lighting incident surface 13 is preferably planar, and has a simple structure and good manufacturability. Besides, the auxiliary lighting incident surface 13 may be a convexly curved surface in order to emit more light incident to the auxiliary lighting incident surface 13 to the first reflecting surface 14, thereby improving the light utilization rate of the auxiliary lighting structure 12. As a preferred embodiment of the auxiliary lighting incident surface 13, referring to FIGS. 7 to 11, the auxiliary lighting incident surface 13 includes a vertical light incident surface 131 and an oblique light incident surface 132, wherein the oblique light incident surface 132 is arranged to extend obliquely forward and downward from a bottom end of the vertical light incident surface 131. In the case that the auxiliary lighting incident surface 13 is a planar surface extending up and down, part of light emitted to a lower half part of the auxiliary lighting incident surface 13 by the auxiliary lighting source 7 is reflected by the first reflecting surface 14 and then is directly emitted by the light emitting part 3 without being reflected by the second reflecting surface 15, so that this part of light is projected at higher illuminance, which is prone to exceeding statutory requirements for illuminance of the low-beam III region. Due to the oblique arrangement of the oblique light incident surface 132, a direction in which light received by the light incident surface is reflected by the first reflecting surface 14 is changed, such that light incident to the oblique light incident surface 132 is reflected and diffused by the second reflecting surface 15 as much as possible before being projected by the light emitting surface of the light emitting part 3 to avoid an overabundance of illuminance of the projected light, thereby forming a more uniform light shape can be formed. Moreover, light received by the light incident surface can be reduced to further reduce light emitted directly after reflection by the first reflecting surface 14, and light projected by the light emitting surface of the light emitting part 3 is projected on the light distribution screen to form an auxiliary lighting shape as shown in FIG. 19, that is more uniform and has lower illuminance than the auxiliary lighting shape as shown in FIG. 18.

Figure 4:
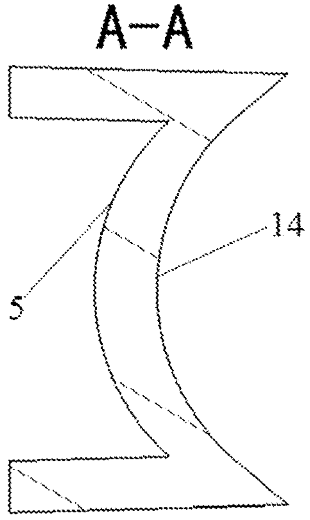
FIG. 4 is a section view A-A in FIG. 3.
Figure 5:
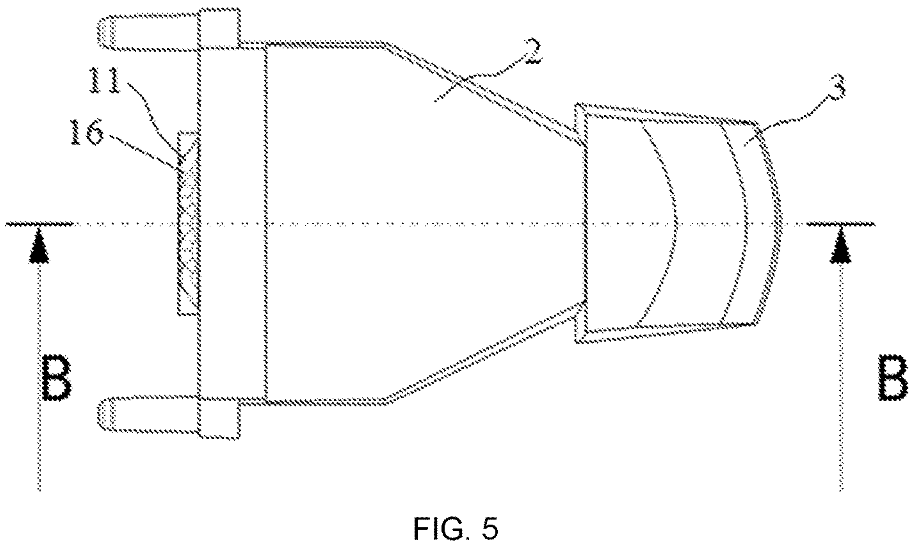
FIG. 5 is a top view of the high-beam optical element shown in FIG. 1.
Figure 6:
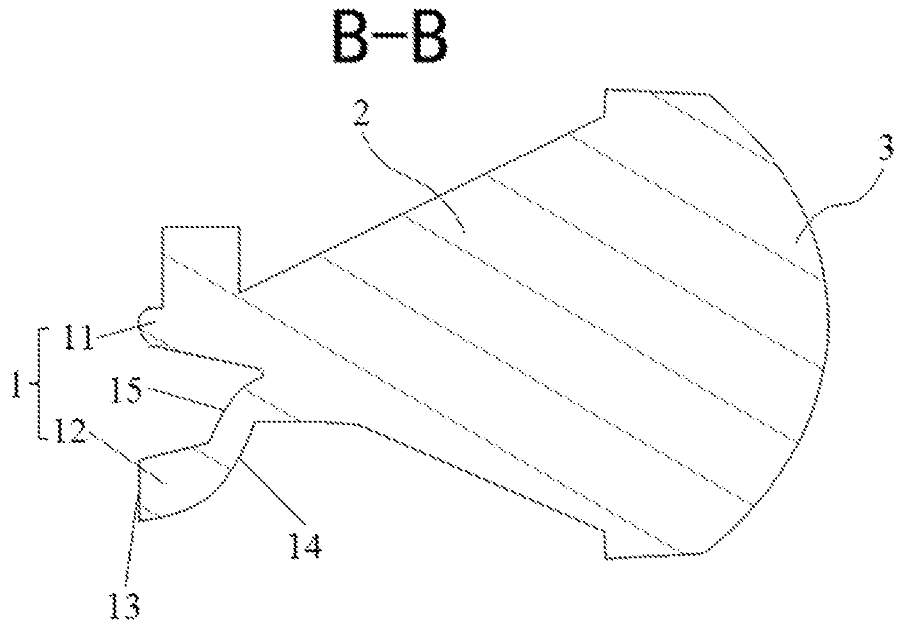
FIG. 6 is section view B-B in FIG. 5.
Figure 10:
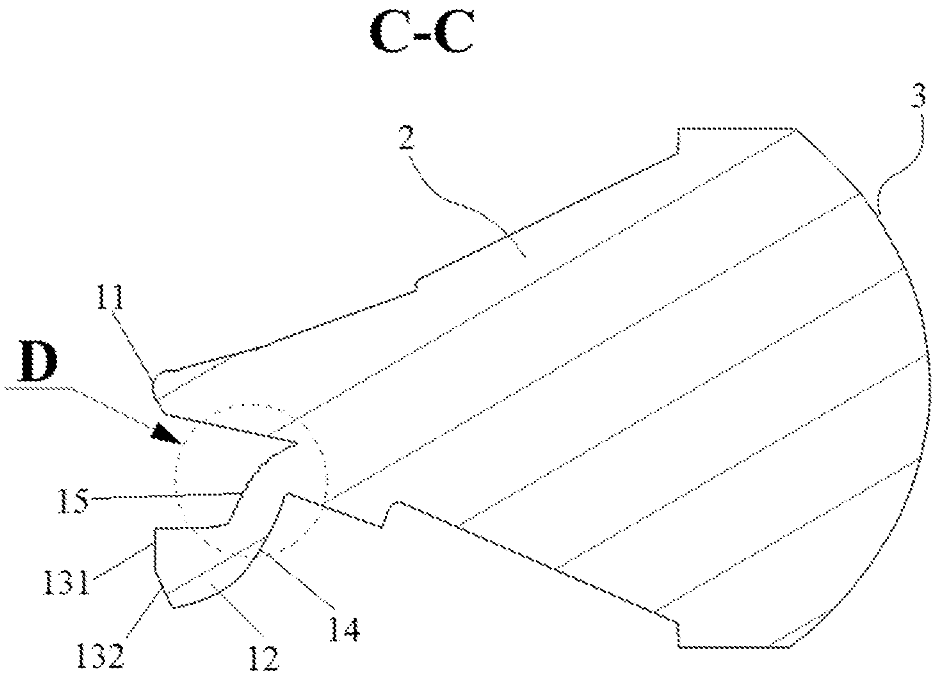
FIG. 10 is a section view C-C in FIG. 9.

As a preferred embodiment of the first reflecting surface 14 and the second reflecting surface 15, referring to FIGS. 4, 6 and 10, a longitudinal section line of the first reflecting surface 14 is provided as a forward convex curve, and a transverse section line of the first reflecting surface 14 is provided as a backward concave curve. A longitudinal section line and a transverse section line of the second reflecting surface 15 are respectively provided as backward convex curves. The arrangement of the transverse section line of the first reflecting surface 14 and the transverse section line of the second reflecting surface 15 can guarantee the thickness between the two reflecting surfaces, avoiding the formation of an unstable structure with a thick middle and thin sides. The arrangement of the longitudinal section line of the first reflecting surface 14 and the longitudinal section line of the second reflecting surface 15 enable the two reflecting surfaces cooperate to reflect light incident from the auxiliary lighting incident surface 13 into the light guide part 2 as much as possible, thereby reducing light reflected to regions other than the light guide part 2, and improving the lighting effect. Furthermore, by setting the width of the second reflecting surface 15 reasonably, it is possible to make light reflected by the second reflecting surface 15 be reflected exactly into the light emitting part 3, ensuring light flux at an edge region of the light emitting part 3, and also favoring the light emitting effect and uniformity of a light emitting shape.

Figure 7:
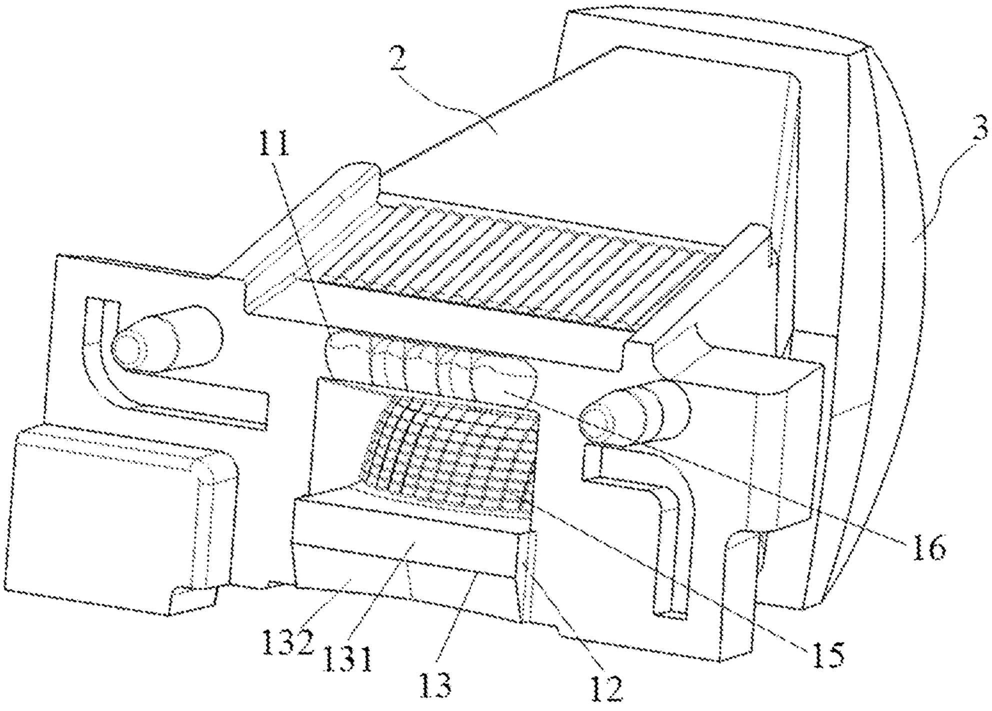
FIG. 7 is a schematic structural diagram I of a high-beam optical element in another embodiment of the present disclosure.
Figure 8:
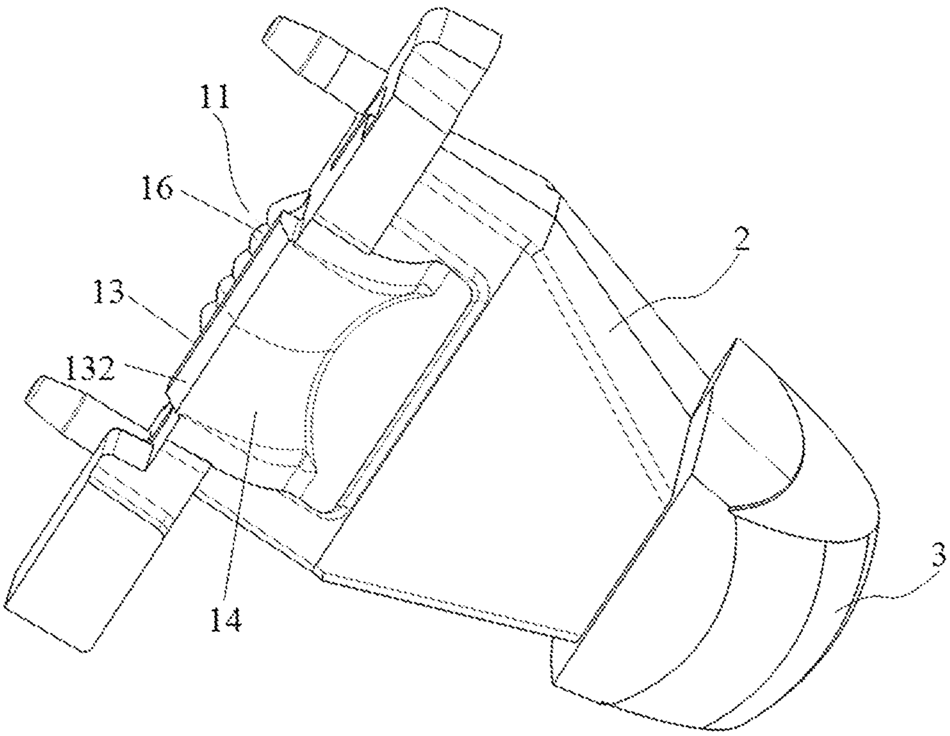
FIG. 8 is a schematic structural diagram II of the high-beam optical element shown in FIG. 7.
Figure 9:
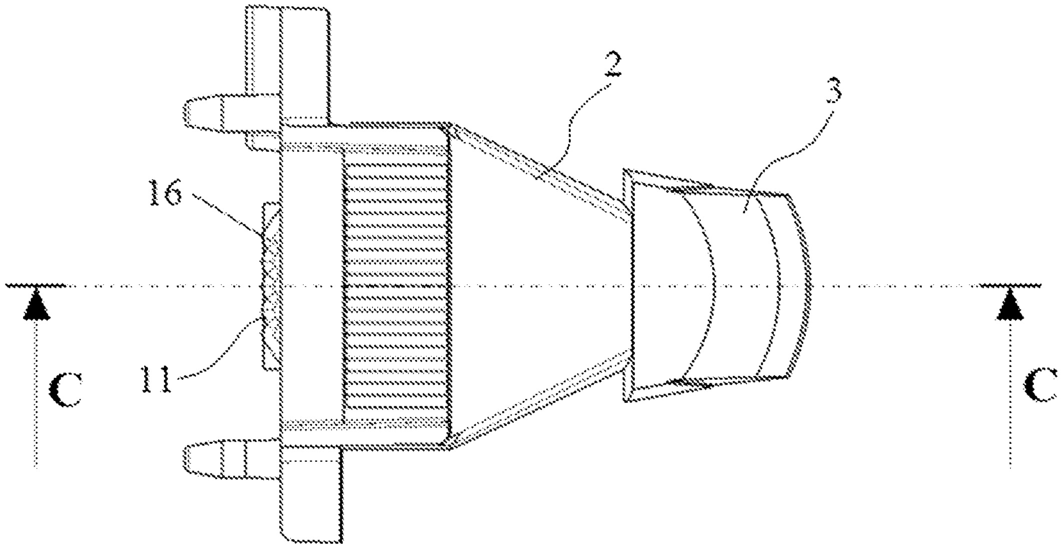
FIG. 9 is a top view of the high-beam optical element shown in FIG. 7.
Figure 11:
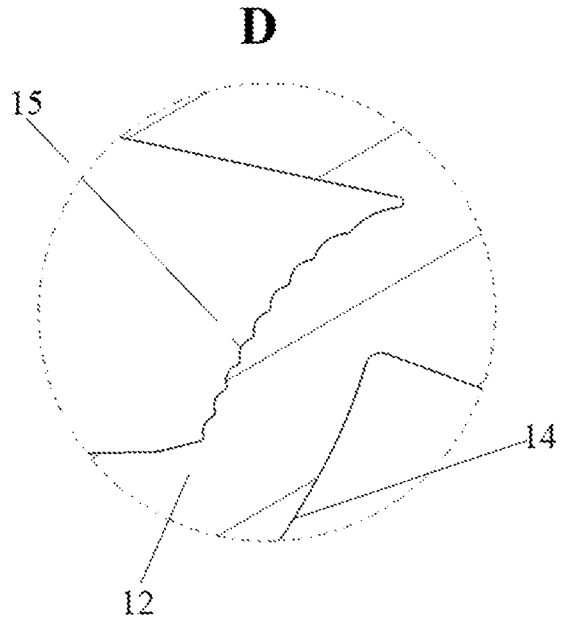
FIG. 11 is a partially enlarged view of a part D in FIG. 10.
Figure 12:
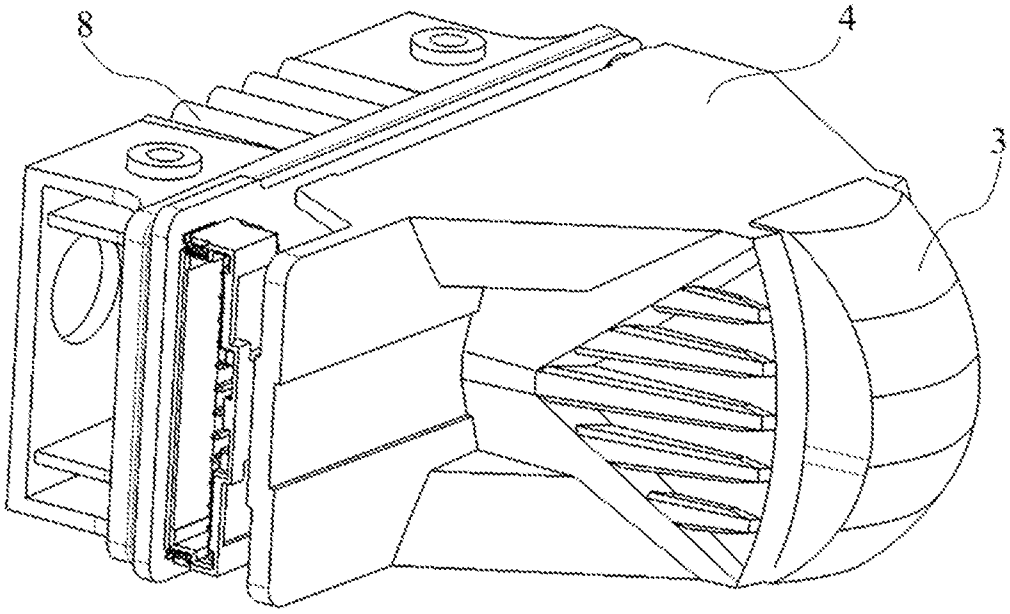
FIG. 12 is a schematic structural diagram of a high-beam illumination unit in a specific embodiment of the present disclosure.
Figure 13:
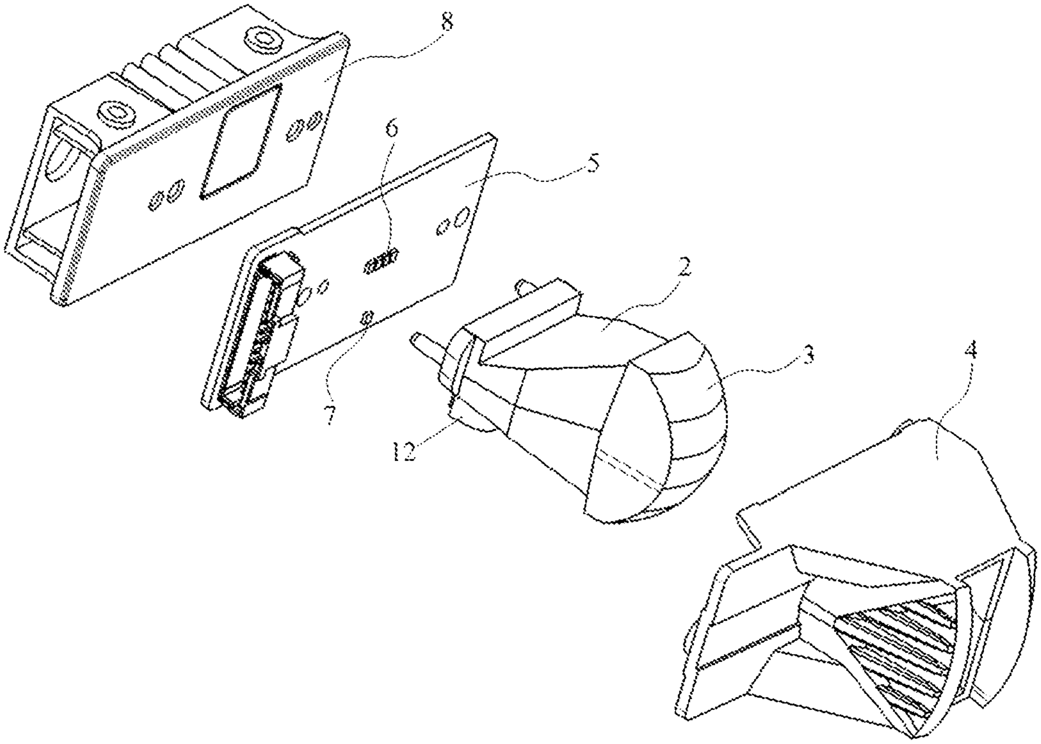
FIG. 13 is an exploded view I of the high-beam illumination unit shown in FIG. 12.
Figure 14:
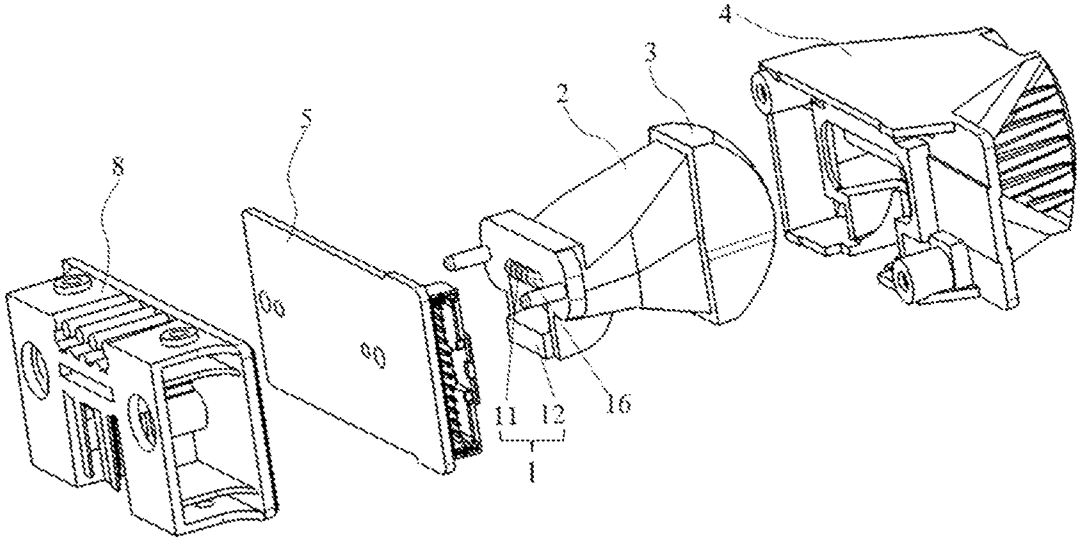
FIG. 14 is an exploded view II of the high-beam illumination unit shown in FIG. 12.
Figure 15:
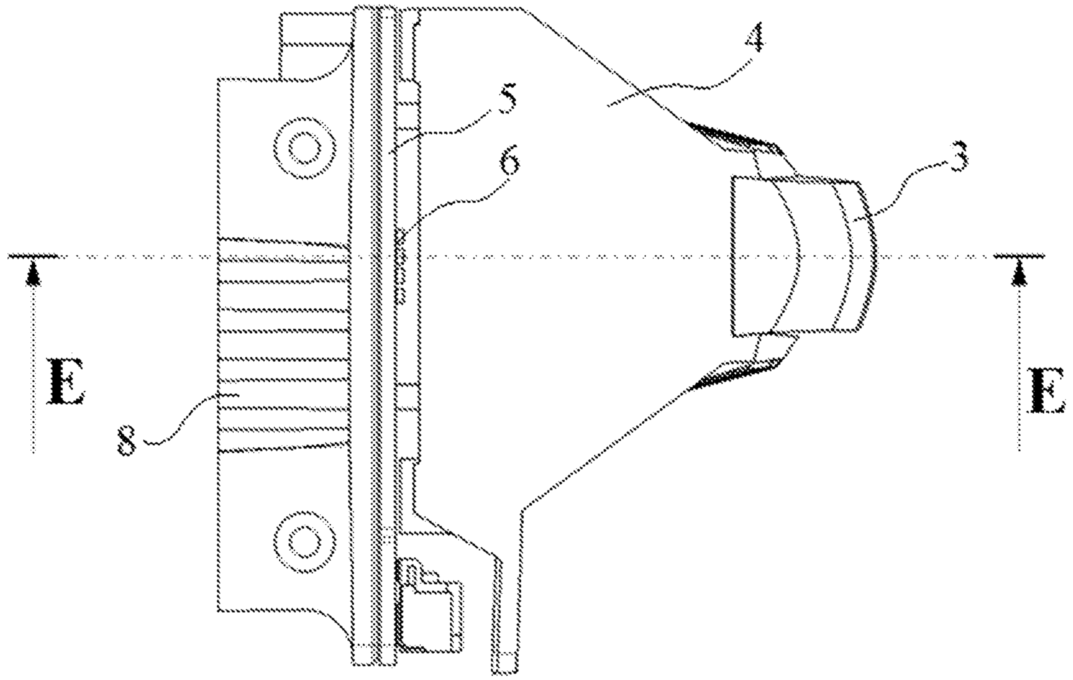
FIG. 15 is a top view of the high-beam illumination unit shown in FIG. 12.
Figure 16:
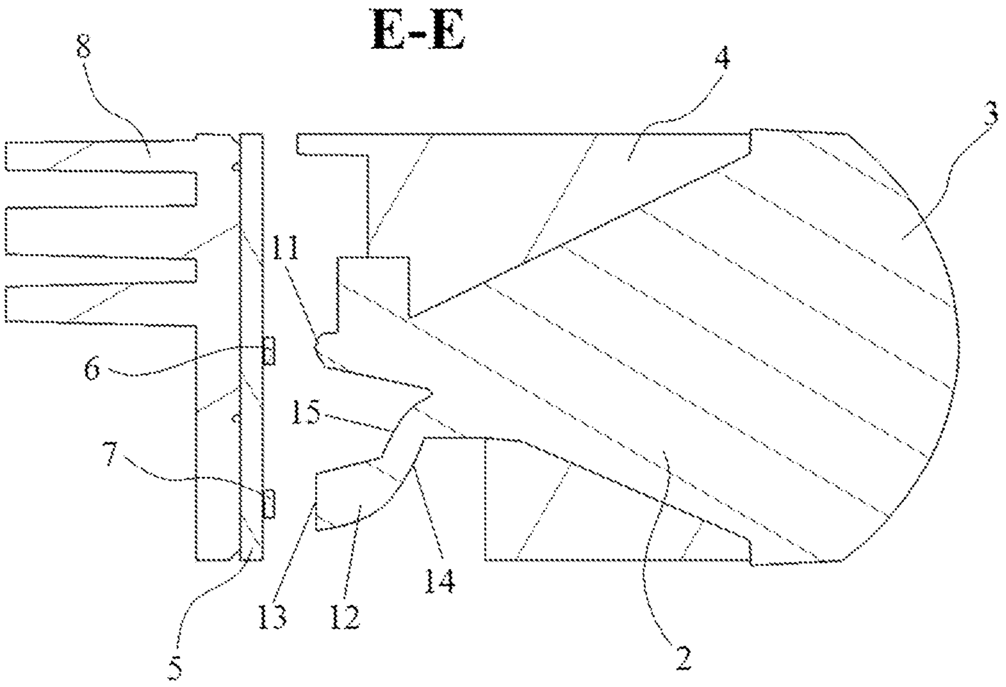
FIG. 16 is section view E-E in FIG. 15.

Further preferably, referring to FIGS. 7, 10 and 11, a light diffusion structure is arranged on the second reflecting surface 15. The light diffusion structure can be a number of block-shaped bumps, block-shaped recesses, striped bumps, striped recesses or other structures capable of changing the shape of the second reflecting surface 15, in order to change the reflection direction of light incident to the second reflecting surface 15 such that light reflected by the second reflecting surface 15 is more dispersed, thereby reducing the illuminance of the light shape formed after transmission by the light guide part 2 and projection by the light emitting part 3, and improving the light shape uniformity to comply with the statutory requirements of the illuminance of the light shape at the low-beam III region.

As another preferred embodiment of the present disclosure, referring to FIGS. 13 to 16, a light-tight housing 4 is arranged or integrally formed on an outer side surface of the light guide part 2. The light-tight housing 4 and the light guide part 2 may be integrally molded by double-shot molding, insert molding, or other molding modes, which are fall within the protection scope of the present disclosure, as long as the light-tight housing 4 can be formed outside the light guide part 2. At this time, light entering the light guide part 2 by reflection of the auxiliary lighting structure 12 and light entering the light guide part 2 by the high-beam incident part 11 can be absorbed by the light-tight housing 4 when transmitted to a side surface of the light guide part 2, such that light emitted by the high-beam source 6 and the auxiliary lighting source 7 is prevented from being emitted from regions other than the light emitting surface of the light emitting part 3 to avoid forming stray light, thereby avoiding affecting the light emitting effect.

As yet another preferred embodiment of the present disclosure, the high-beam incident part 11 includes at least one light incident structure 16. A rear end surface of each of the light incident structures 16 is provided as a backward convex curved surface or conical surface, and the light incident structures 16 are arranged in a matrix mode. The light incident structures 16 are set to at least one row. The rear end surfaces of the light incident structures 16 are each provided as a backward convex curved surface or conical surface to converge incident light. Optionally, the light incident structures 16 are arranged in one row, two rows or a plurality of rows, and the light incident structures 16 are connected in sequence or arranged at intervals. The light emitting surface of the light emitting part 3 is provided as a forward convex surface formed by splicing a plurality of planar surfaces or curved surfaces in a grid-like distribution, such that light emitted through the light emitting surface of the light emitting part 3 is diffused by a certain angle, thereby increasing a boundary angle of the light shape formed by the emergent light, and meanwhile, improving the light shape uniformity.

In a second aspect, the present disclosure provides a high-beam illumination unit. Referring to FIGS. 12 to 16, the high-beam illumination unit includes the above high-beam optical element, a circuit board 5, a high-beam source 6 arranged in correspondence with the high-beam incident part 11, and an auxiliary lighting source 7 arranged in correspondence with the auxiliary lighting structure 12, wherein the high-beam source 6 and the auxiliary lighting source 7 are arranged on the circuit board 5.

Optionally, the high-beam illumination unit is also provided with a heat radiator 8, a heat dissipation support, or other structures for providing support and heat dissipation functions to the circuit board 5 and the high-beam optical element. When the light-tight housing 4 is arranged or integrally formed on the outer side surface of the light guide part 2, the light-tight housing 4 can be connected to the circuit board 5 and the heat radiator 8 to support the high-beam optical element.

In a relatively preferred embodiment of the present disclosure, the high-beam illumination unit includes a high-beam optical element, a circuit board 5, a light source located on the circuit board 5, and a heat radiator 8 connected to the circuit board 5. The high-beam optical element includes a light incident part 1, a light guide part 2 and a light emitting part 3 which are sequentially arranged and integrally formed from rear to front. The light incident part 1 includes a high-beam incident part 11 and an auxiliary lighting structure 12 located below the high-beam incident part 11. The auxiliary lighting structure 12 includes an auxiliary lighting incident surface 13, a first reflecting surface 14 and a second reflecting surface 15 located above the first reflecting surface 14, and a rear end surface of the auxiliary lighting structure 12 is formed as the auxiliary lighting incident surface 13. The auxiliary lighting incident surface 13 includes a vertical light incident surface 131 and an oblique light incident surface 132, wherein the oblique light incident surface 132 is arranged to extend obliquely forward and downward from a bottom end of the vertical light incident surface 131. The first reflecting surface 14 can reflect light received by the auxiliary lighting incident surface 13 to the second reflecting surface 15, and the second reflecting surface 15 can reflect light reflected to the second reflecting surface 15 by the first reflecting surface 14 to the light guide part 2. A longitudinal section line of the first reflecting surface 14 is provided as a forward convex curve, and a transverse section line of the first reflecting surface is provided as a backward concave curve. A longitudinal section line and a transverse section line of the second reflecting surface 15 are respectively provided as backward convex curves, and the second reflecting surface 15 is provided with a light diffusion structure formed by a plurality of block-shaped bumps. A light-tight housing 4 is arranged or integrally formed on an outer side surface of the light guide part 2. A light emitting surface of the light emitting part 3 is provided as a forward convex surface formed by splicing a plurality of curved surfaces in a grid-like distribution. The high-beam incident part 11 includes a plurality of light incident structures 16, a rear end surface of each light incident structure 16 is provided as a backward convex curved surface or conical surface, and the light incident structures 16 are arranged in a row. The light source includes a high-beam source 6 arranged in correspondence with the high-beam incident part 11 and an auxiliary lighting source 7 arranged in correspondence with the auxiliary lighting structure 12.

For the high-beam illumination unit described in the above embodiment, in a high-beam mode, the high-beam source 6 is turned on, and the auxiliary lighting source 7 is turned off. Light emitted by the high-beam source 6 enters the light guide part 2 after converged by the light incident structure 16, is transmitted to the light emitting part 3 by the light guide part 2, and finally is emitted by the light emitting surface of the light emitting part 3 to form high-beam illumination light. In the low-beam illumination mode, the auxiliary lighting source 7 is turned on, and the high-beam source 6 is turned off. Light emitted by the auxiliary lighting source 7 is incident to the auxiliary lighting incident surface 13, then is reflected and diffused by the first reflecting surface 14 to the second reflecting surface 15, enters the light guide part 2 after reflected and diffused by the second reflecting surface 15, is transmitted to the light emitting part 3 by the light guide part 2, and finally is projected by the light emitting surface of the light emitting part 3 into the low-beam III region at a certain diffusion angle to form an auxiliary lighting shape as shown in FIG. 19, thereby achieving the lighting effect of the high-beam illumination unit in the low-beam illumination mode. The light-tight housing 4 can prevent light emitted by the high-beam source 6 and the auxiliary lighting source 7 from being emitted from regions other than the light emitting surface of the light emitting part 3 to avoid forming stray light.

Further, in a third aspect, the present disclosure also provides a vehicle, including the high-beam illumination unit according to the technical solution in the second aspect. A plurality of high-beam illumination units are arranged, and the plurality of high-beam illumination units are integrally arranged or dispersed in a vehicle lamp. Optionally, the high-beam illumination units are distributed in the vehicle lamp in longitudinally, horizontally or obliquely. The vehicle provided by the present disclosure at least has all the beneficial effects provided by the solutions in the embodiments of the above high-beam optical element and high-beam illumination unit. The constitution and operation of the vehicle according to the embodiments of the present disclosure are understandable and easily implementable to those skilled in the art, and therefore will not be described in detail.

As can be seen from the above description, the high-beam optical element of the present disclosure is provided with the auxiliary lighting structure 12 on one side of the high-beam incident part 11. Light incident to the auxiliary lighting structure 12 is transmitted to the light guide part 2 after at least one reflection, then is transmitted to the light emitting part 3 by the light guide part 2, and subsequently is projected into the low-beam III region by the light emitting surface of the light emitting part 3. When a person stands in front of a vehicle lamp, this part of light is directed directly to the human eyes obliquely upward, making this person see that the high-beam illumination unit also emits light, and achieving a visual effect of lighting of the light emitting surface in the low-beam illumination mode. The light incident to the auxiliary lighting structure 12 is directly transmitted and projected by the light guide part 2 and the light emitting part 3, and compared with the solution that light is subjected to total reflection in the light emitting part 3, and is utilized to form light subjected to diffuse reflection via impurities in the light emitting part 3, and the light subjected to diffuse reflection is directed to the human eyes to achieve the light emitting effect of the high-beam illumination unit, the high-beam optical element in the present disclosure is employed to make the high-beam illumination unit seen brighter, such that the lighting brightness of the high-beam illumination unit is more easily consistent with the brightness of a low-beam illumination unit in the statutory scope of illuminance of the light shape in the low-beam III region, thereby achieving a better lighting effect of the appearance style of the vehicle lamp.

The preferred embodiments of the present disclosure are described in detail in combination with the drawings, but the present disclosure is not limited to the specific details in the above embodiments. Various simple variations can be made to the technical solutions of the present disclosure in the scope of the technical concept of the present disclosure, and these simple variations all fall within the protection scope of the present disclosure.

In addition, it should be noted that all the specific technical features described in the specific embodiments can be combined in any appropriate mode under the non-contradictory condition, and all possible combination modes will not be described separately in order to avoid unnecessary repetition.

In addition, various different embodiments of the present disclosure can also be combined optionally, and as long as the embodiments do not violate the idea of the present disclosure, the embodiments also should be regarded as the content disclosed by the present disclosure.

The invention claimed is:

1. A high-beam optical element, comprising:

a light incident part having a high-beam incident part and an auxiliary lighting structure;

a light guide part; and a light emitting part with a light emitting surface, wherein the light incident part, the light guide part and the light emitting part are sequentially arranged from back to front, the light emitted from the light incident part enters from the high-beam incident part, and is sequentially transmitted to the light guide part and the light emitting part, finally, it is emitted by the light emitting surface to form high-beam illumination light, and the auxiliary lighting structure comprising:

an auxiliary lighting incident surface;

a first reflecting surface; and a second reflecting surface;

a rear end surface of the auxiliary lighting structure is formed as the auxiliary lighting incident surface; the first reflecting surface is configured to reflect light received by the auxiliary lighting incident surface to the second reflecting surface; and the second reflecting surface is configured to reflect light reflected from the first reflecting surface to the light guide part; the auxiliary lighting structure is located below the high-beam incident part, and the first reflecting surface is located below the second reflecting surface; the auxiliary lighting incident surface comprises a vertical light incident surface and an oblique light incident surface, and the oblique light incident surface is arranged to extend obliquely forward and downward from a bottom end of the vertical light incident surface;

in order that the auxiliary lighting structure configured to transmit incident light to the light guide part after at least one reflection, to then be projected into a low-beam III pattern by the light emitting surface.

2. The high-beam optical element according to claim 1, further comprising a light-tight housing provided or integrally formed on an outer side surface of the light guide part.

3. The high-beam optical element according to claim 1, wherein the high-beam incident part comprises at least one light incident structure; a rear end surface of each of the light incident structures is provided as a backward convex curved surface or conical surface, the at least one light incident structure forming an array; and a light emitting surface in the light emitting part and provided as a forward convex surface formed by splicing a plurality of planar surfaces or curved surfaces in a grid.

4. The high-beam optical element according to claim 1, wherein a longitudinal section line of the first reflecting surface is provided as a forward convex curve, and a transverse section line of the first reflecting surface is provided as a backward concave curve; and a longitudinal section line and a transverse section line of the second reflecting surface are respectively provided as backward convex curves.

5. The high-beam optical element according to claim 4, further comprising a light diffusion structure is arranged on the second reflecting surface.

6. A high-beam illumination unit, comprising the high-beam optical element according to claim 1;

a circuit board;

a high-beam source arranged to correspond with the high-beam incident part; and an auxiliary lighting source arranged to correspond with the auxiliary lighting structure, wherein the high-beam source and the auxiliary lighting source are arranged on the circuit board.

7. The high-beam illumination unit according to claim 6, wherein a longitudinal section line of the first reflecting surface is provided as a forward convex curve, and a transverse section line of the first reflecting surface is provided as a backward concave curve; and a longitudinal section line and a transverse section line of the second reflecting surface are respectively provided as backward convex curves.

8. The high-beam illumination unit according to claim 6, wherein the high-beam incident part comprises at least one light incident structure; a rear end surface of each of the light incident structures is provided as a backward convex curved surface or conical surface, the at least one light incident structure forming arrays; and a light emitting surface in the light emitting part and provided as a forward convex surface formed by splicing a plurality of planar surfaces or curved surfaces in a grid.

9. A vehicle, comprising the high-beam illumination unit according to claim 6.

10. The vehicle according to claim 9, wherein a longitudinal section line of the first reflecting surface is provided as a forward convex curve, and a transverse section line of the first reflecting surface is provided as a backward concave curve; and a longitudinal section line and a transverse section line of the second reflecting surface are respectively provided as backward convex curves.

11. The vehicle according to claim 9, wherein the high-beam incident part comprises at least one light incident structure; a rear end surface of each of the light incident structures is provided as a backward convex curved surface or conical surface, the at least one light incident structure forming an array; and a light emitting surface in the light emitting part and provided as a forward convex surface formed by splicing a plurality of planar surfaces or curved surfaces in a grid.

* * * * *